(12) United States Patent
Schmidt

(10) Patent No.: US 7,035,244 B2
(45) Date of Patent: Apr. 25, 2006

(54) METHOD FOR SYNCHRONIZATION OF A CDMA-SIGNAL

(75) Inventor: Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 950 days.

(21) Appl. No.: 09/985,137

(22) Filed: Nov. 1, 2001

(65) Prior Publication Data

US 2002/0080761 A1 Jun. 27, 2002

(30) Foreign Application Priority Data

Nov. 3, 2000 (DE) ................................ 100 54 517

(51) Int. Cl.
*H04B 7/216* (2006.01)
(52) U.S. Cl. ..................................... 370/342; 370/350
(58) Field of Classification Search ............... 375/143, 375/144, 145, 140, 142, 149, 150; 370/320, 370/335, 342, 350, 441, 479
See application file for complete search history.

(56) References Cited

U.S. PATENT DOCUMENTS

| | | | | |
|---|---|---|---|---|
| 6,373,881 B1 * | 4/2002 | Mizuguchi et al. | ......... | 375/147 |
| 6,748,006 B1 * | 6/2004 | McDonough et al. | ....... | 375/140 |
| 6,766,337 B1 * | 7/2004 | Bae et al. | .................... | 708/250 |
| 6,801,569 B1 * | 10/2004 | Yang | ........................... | 375/152 |
| 6,895,421 B1 * | 5/2005 | Dor et al. | .................... | 708/400 |

FOREIGN PATENT DOCUMENTS

| | | |
|---|---|---|
| DE | 199 19 545 A1 | 11/2000 |
| DE | 199 53 349 A1 | 6/2001 |
| JP | 09018458 A | 1/1997 |

* cited by examiner

*Primary Examiner*—Kwang Bin Yao
(74) *Attorney, Agent, or Firm*—Birch, Stewart, Kolasch & Birch, LLP

(57) ABSTRACT

A method for synchronization of an input-chip-sequence (x(v)) of a CDMA-signal with a Pilot-Chip-Sequence (pn (v)) having the method steps of: dividing the Pilot-Chip-Sequence (pn(v)) into subintervals (1, 2, 3 ... 8); assembling a particular number ($2 \cdot Anz_{Sub}$) of the subintervals (1, 2, 3 ... 8) into subinterval groups; forming at least one summed subinterval group(s) ($pn_{\Sigma1}$ (v), ...) by linewise, pairwise arranging respective one-following-the-other subintervals (1,2; 2,3; 3,4; ... 8,1), with the first subinterval of a particular line being respectively the second subinterval of the previous line, and column-wise adding the chips of all the line-wise, pair-wise arranged subintervals (1,2; 2,3; 3,4; ... 8,1); and correlating the input-chip sequence with each summed subinterval group ($pn_{\Sigma1}$ (v), ...) in a first correlation (5; 5a; 5b) for determining a displacement (Ôffset) between the input-chip-sequence and that of the summed subinterval group(s) ($pn_{\Sigma1}$ (v), ...).

10 Claims, 3 Drawing Sheets

METHOD FOR SYNCHRONIZATION OF A CDMA-SIGNAL

BACKGROUND OF THE INVENTION

This application claims a priority from German patent application No. 100 54 517.3, filed on Nov. 3, 2000, the contents of which are incorporated by reference herein.

This invention concerns a method for synchronization of CDMA signals. For a CDMA (Code Division Multiplex Access)—method, a plurality of orthogonal codes are simultaneously transmitted. In this manner, symbols are divided in a known manner so that each symbol is of a plurality of chips. In this regard, there is the necessity to carry out a so-called Pilot Synchronization. For a Pilot Synchronization, an input-chip-sequence is compared with a known pilot-chip-sequence in order to determine a displacement, or shift, (offset) between the input-chip-sequence and the pilot-chip-sequence, which is generally referred to as the pn-sequence. To determine this offset for a standard IS-95, for example, information in a pilot channel having the characteristic that the symbols as well as also a Walsh-code is a constant 1 is utilized and thus only the pn-sequence is present.

The synchronization of the input-chip-sequence with the pilot-chip-sequence (pn-sequence) usually is carried out by correlation. The pn-sequence has a periodicity, or frequency, of $2^{15}$ chips and is, therefore, relatively long. A direct correlation of the input-chip-sequence with the pilot-chip-sequence, when using a hardware implementation, leads to a relatively high logic gate requirement. And, upon a software implementation, it leads to a relatively long calculation time.

It is, therefore, an object of this invention to provide a method for synchronizing an input-chip-sequence of a CDMA signal with a pilot-chip-sequence that can be carried out in a short calculation time because of an efficient algorithm.

SUMMARY OF THE INVENTION

According to principles of this invention, a method for synchronization of an input-chip-sequence of a CDMA-signal with a pilot-chip-sequence includes the steps of: dividing the pilot-chip-sequence into subintervals; assembling a particular number of the subintervals into subinterval groups; forming at least one summed subinterval group(s) by linewise, pairwise arranging respective one-after-the-other series subintervals such that the first subinterval of a particular line is respectively the second subinterval of the previous line, and column-wise adding the chips of all the line-wise, pair-wise arranged subintervals; and correlating the input-chip sequence with each summed subinterval group in a first correlation for determining a displacement (Offset) between the input-chip-sequence and that of the summed subinterval group(s).

The invention is based on the recognition that by forming appropriate subinterval groups through appropriate line-wise, pair-wise arrangement and column-wise summing of these subintervals, a correlation can be significantly shortened, because instead of a correlation with the entire pilot-chip-sequence, only a correlation with the substantially shorter summed subinterval groups need be carried out. In a simplest case, only a single summed subinterval group that encompasses all subintervals need be formed. If this is not possible because of the signal-to-noise ratio, a plurality of summed subinterval groups can also be formed, with each encompassing a part of the different subintervals. The correlation result is then, indeed, not well defined; however, the conclusion in the observed summed subinterval group that is correct can quickly be determined in a simple second correlation. Upon the second correlation only a few assumptions need be tested by a known time shift. A calculation time required for this is negligible.

BRIEF DESCRIPTION OF THE DRAWINGS

Further benefits, characteristics and details of the invention are explained in more detail below using embodiments shown in the drawings. The described and drawn features, can be used individually or in preferred combinations in other embodiments of the invention. The foregoing and other objects, features and advantages of the invention will be apparent from the following more particular description of the preferred embodiments of the invention, as illustrated in the accompanying drawings in which reference characters refer to the same parts throughout the different views. The drawings are not necessarily to scale, emphasis instead being placed upon illustrating principles of the invention in a clear manner. The drawings are.

DETAILED DESCRIPTION OF THE INVENTION

Figure 1:
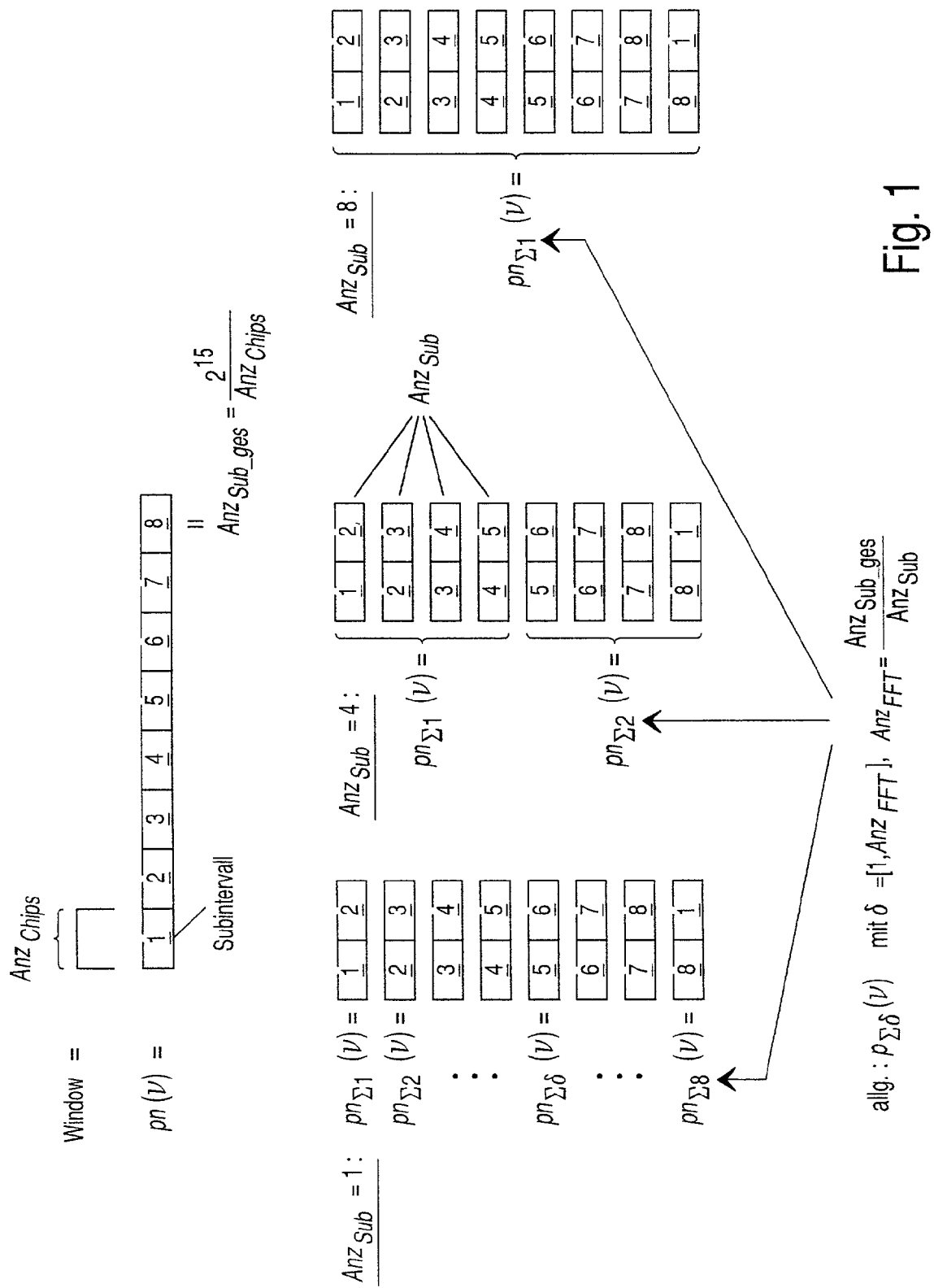
FIG. 1 is a schematic representation of three (3) embodiments of methods for forming summed subinterval groups used in this invention.

FIG. 1 shows a chart to explain the forming of summed subinterval groups. A pilot-chip-sequence pn (v) (also generally referred to as pn-sequence) is divided into a plurality of subintervals, in the shown embodiment into eight subintervals 1, 2, 3, . . . , 8. The pilot-chip-sequence pn (v) is of a total of $2^{15}$ chips in the shown example. Each subinterval 1, 2, 3 . . . , 8 is of $Anz_{Chip}$ chips. Thus, in total, $$\frac{2^{15}}{Anz_{Chips}}$$

$$Anz_{\text{Sub\_ges}} = \frac{2^{15}}{Anz_{Chips}} \qquad (1)$$

subintervals are formed, in the example eight subintervals. The observation length $Anz_{Chips}$ can only be chosen of such a size that a phase difference caused by frequency errors resulting from reception is sufficiently small.

In FIG. 1 there are three examples shown for forming the summed subinterval groups of the subintervals 1, 2, 3, . . . , 8. In the embodiment shown in FIG. 1, below and to the left, eight summed subinterval groups $pn_{\Sigma 1}$ (v), $pn_{\Sigma 2}$ (v), . . . $pn_{\Sigma 6}(v)$, . . . $pn_{\Sigma 8}$ (v) are formed. The number of the one-above-the-other subintervals within a group totals $Anz_{Sub}=1$. In the embodiment shown in FIG. 1, at the bottom and in the middle, the parameter totals $Anz_{Sub}=4$ and there are 8/4=2 summed subintervals $pn_{\Sigma 1}$ (v) and $pn_{\Sigma 2}$ (v) formed. In the embodiment shown in FIG. 1, at the bottom and to the right, the parameter totals $Anz_{Sub}=8$ and only one single subinterval group $pn_{\Sigma 1}(v)$ is formed.

The forming rules for forming the summed subinterval groups have in common that the subintervals 1, 2, 3, ..., 8 are each arranged linewise in pairs. The arrangement takes place continuously in a manner such that the first subinterval of a particular line is identical with the second subinterval of the immediately-above previous line. The first subinterval 1 in the first line is, in this regard, therefore identical with the last subinterval 1 in the last line so that the arrangement is cyclically closed.

Then a column-wise summation of the chips takes place of all lines forming a summed subinterval group. Because in the embodiment shown in FIG. 1, at the bottom left, each subinterval group $pn_{\Sigma 8}(v)$ only includes a single line, summation for this particular embodiment is respectively only a single summation term and can remain below.

For the embodiment shown in the middle of FIG. 1 the summation respectively results over four lines; that is, the first chip of the first summed subinterval group $pn_{\Sigma 1}(v)$ is of the sum from the first chip of the subinterval 1, the first chip of the subinterval 2, the first chip of the subinterval 3, and the first chip of the subinterval 4. The last chip of the first summed subinterval group $pn_{\Sigma 1}(v)$, is of the sum from the last chip of the subinterval 2, the last chip of the subinterval 3, the last chip of the subinterval 4, and the last chip of the subinterval 5. Accordingly, the first chip of the second summed subinterval group $pn_{\Sigma 2}(v)$ is of the sum of the first chip of the subinterval 5, the first chip of the subinterval 6, the first chip of the subinterval 7, and the first chip of the subinterval 8. The last chip of the second summed subinterval group $pn_{\Sigma 2}(v)$ is of the sum from the last chip of the subinterval 6, the last chip of the subinterval 7, the last chip of the subinterval 8, and the last chip of the subinterval 1.

For the embodiment shown in FIG. 1 at the bottom right, the summation results over all lines of the linewise, pairwise arranged subintervals; that is, the first chip of the single subinterval group $pn_{\Sigma 1}(v)$ is of the sum of the first chip of the subinterval 1, the first chip of the subinterval 2, the first chip of the subinterval 3, the first chip of the subinterval 4, the first chip of the subinterval 5, the first chip of the subinterval 6, the first chip of the subinterval 7, and the first chip of the subinterval 8, while the last chip of the single summed subinterval group $pn_{\Sigma 1}(v)$ is of the sum of the last chip of the subinterval 2, the last chip of the last subinterval 3, the last chip of the subinterval 4, the last chip of the subinterval 5, the last chip of the subinterval 6, the last chip of the subinterval 7, the last chip of the subinterval 8, and the last chip of the subinterval 1.

Figure 2:
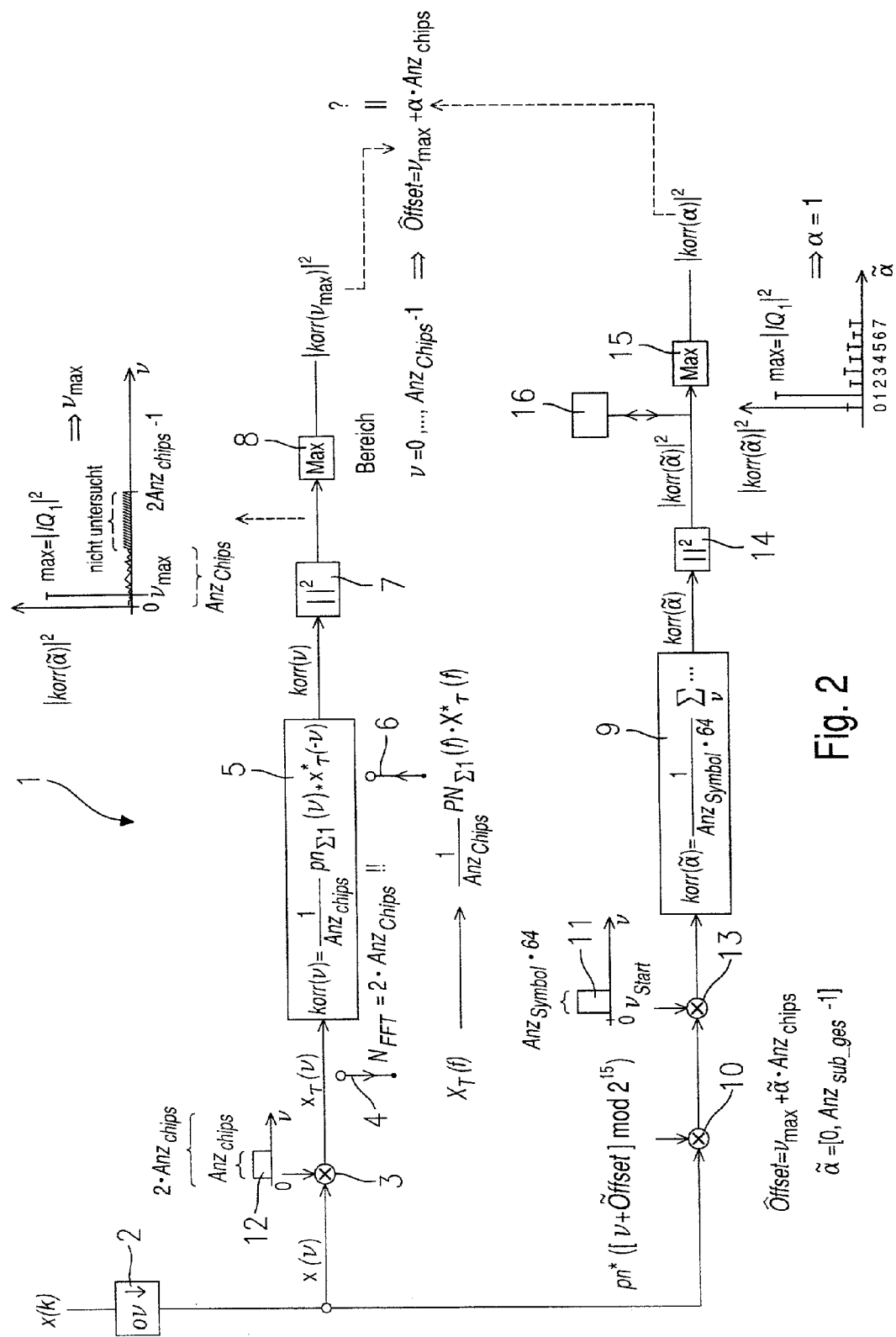
FIG. 2 is a first embodiment of an apparatus for carrying out a method according to this invention.

FIG. 2 shows a first embodiment of an arrangement for carrying out a method of this invention according to a formation of the summed subinterval group $pn_{\Sigma 1}(v)$ corresponding to the embodiment shown in FIG. 1, bottom right, with $Anz_{Sub}=8$. First, a down sampling takes place in a down sampler 2 at whose output the input chip sequence $x(v)$ is made available. The input-chip-sequence $x(v)$ involves a CDMA-signal with which, as is well known, each symbol is divided in multiple chips. This input-chip-sequence $x(v)$ should, according to the method of this invention, be synchronized with the pilot-chip-sequence $pn(v)$, with the pilot-chip-sequence $pn(v)$ being prepared as described in relation to FIG. 1; that is, it is divided into subintervals and a summed subinterval group $pn_{\Sigma 1}(v)$ is formed. This has the advantage that, contrary to the necessity for carrying out a correlation with the entire pilot-chip-sequence $pn(v)$ (that, in this embodiment, has a length of $2^{15}$ chips) as was done in the prior art, only one correlation need be made in this embodiment with the shortened summed subinterval group $pn_{\Sigma 1}(v)$ that has been shortened to $2^{15}/4=2^{13}$ chips. Normally, this correlation would be carried out not as a convolution in the time domain rather as multiplication in the frequency domain. A Fourier transformation necessary for this requires, in the method of this invention, a substantially smaller expense; further, the multiplication can be carried out much more quickly.

As shown in FIG. 2, first a limiting of a time window 12 of the input-chip-sequence $x(v)$ takes place in a multiplier 3 to a number of the chips per subinterval $Anz_{Chips}$. Then in step 4 a Fourier transformation of the time-wise limited input-chip-sequence $x_\tau(v)$ to $X_T(f)$ takes place, of the corresponding representation in the frequency domain. The above-described first correlation 5 of the input-chip-sequence with the summed subinterval group $pn_{\Sigma 1}(v)$ is, as is made clear in FIG. 2, carried out by multiplication of the Fourier-transfomated $PN_{\Sigma 1}(f)$ with the conjugated complex $X*_\tau(f)$. Finally, a Fourier reverse transformation 6 takes place in the time domain, with the correlation result korr($v$) being made available at the output of the first correlator 5. In an apparatus 7 the square of the absolute value of the correlation result of the first correlation is calculated and in an apparatus 8 a maximum of the square of the absolute value of the correlation result $|korr(v_{max})|^2$ is calculated. From the square of the absolute value of the maximum of the correlation result an estimated displacement $\hat{O}ffset$ between the input-chip-sequence $x(v)$ and the pilot-chip-sequence $pn(v)$ can be determined as follows:

$$\hat{O}ffset = v_{max} + \alpha \cdot Anz_{Chips} \qquad (2)$$

The result for the estimated displacement $\hat{O}ffset$ is not clear because the formation rules for a summed subinterval group $pn_{\Sigma 1}(v)$ for a certain correlation result, as is shown in FIG. 1, bottom right, results in a total of eight possible positions for the calculated maximum within the pilot-chip-sequence $pn(v)$. Stated generally, there are $Anz_{Sub\_ges}$ different solution possibilities that are periodic with the number of chips per subinterval $Anz_{Chips}$, as is expressed in formula (2). Now only the frequency factor a must be determined.

This results from a second correlation 9. For this, with eight different solutions for the displacement $\hat{O}ffset$ of this embodiment, each of the conjugated complexes of the pilot-chip-sequence pn* is, one after the other, shifted and multiplied in a multiplier 10 by the input-chip-sequence $x(v)$. The convolution is only calculated at one single point of time, because the $\hat{O}ffset$ is already known and it must only be tested by a simple multiplication in which for the eight different solutions of the $\hat{O}ffset$ the largest correlation maximum appears. Thus, the second correlation 9 can take place in the time domain and a Fourier transformation is not required. Further, a second time window 11 for the second correlation 9, in comparison to the first time window 12 for the first correlation 5, is reduced because of the non-overlaid correlation. Preferably, it amounts to a whole number multiple of the number of chips per symbol $Anz_{Symbol}$, that, in the shown embodiment, is $64 \cdot Anz_{Symbol}$ Chips. The limitation at the second time window 11 takes place in a multiplier 13.

The result of the second correlation korr ($\alpha$) is fed to a device 14 for forming a square of absolute value. The second correlation 9 is carried out one-after-the-other for all possible results of the displacement $\hat{O}ffset$; thus eight times in the shown embodiment. Instead of a serial handling of the different displacement $\hat{O}ffsets$, these eight different possible solutions can also, of course, be worked out in parallel in parallel-arranged second correlators 9 so that the second correlation results are made available even quicker.

In the shown embodiment, the various correlation results are intermediately stored in a puffer memory 16. Finally, the maximums of all $\text{Anz}_{sub\_ges}$ results of the second correlation 9 are compared in a device 15 and the greatest maximum is determined. The particular factor $\alpha$, at which the greatest maximum appears (in the example shown in FIG. 2 $\alpha=1$) is applied in formula (2) and the final displacement Ôffset results.

The embodiment shown in FIG. 2 has the advantage that only a single first correlation 5 must be carried out. A final signal-to-noise ratio is caused by additive interference and by the generally dominating cross correlation of the received sequence with the sync sequence. A second interference source depends upon how great the observed length $\text{Anz}_{Chips}$ is and the number of the subintervals $\text{Anz}_{Sub}$ chosen. For a sufficiently large signal-to-noise ratio, this embodiment is, therefore, preferred. With an increasing number of one-above-the-other subintervals Anzsub, more subintervals go into the column-wise summation and this reduces the signal-to-noise. For a signal-to-noise that is too small, it is preferable to form more summed subinterval groups $pn_{\Sigma 1}$ (v),$pn_{\Sigma 2}$ (v), . . . (see the left and middle embodiments in FIG. 1) and to manipulate these in parallel-arranged first correlators.

Figure 3:
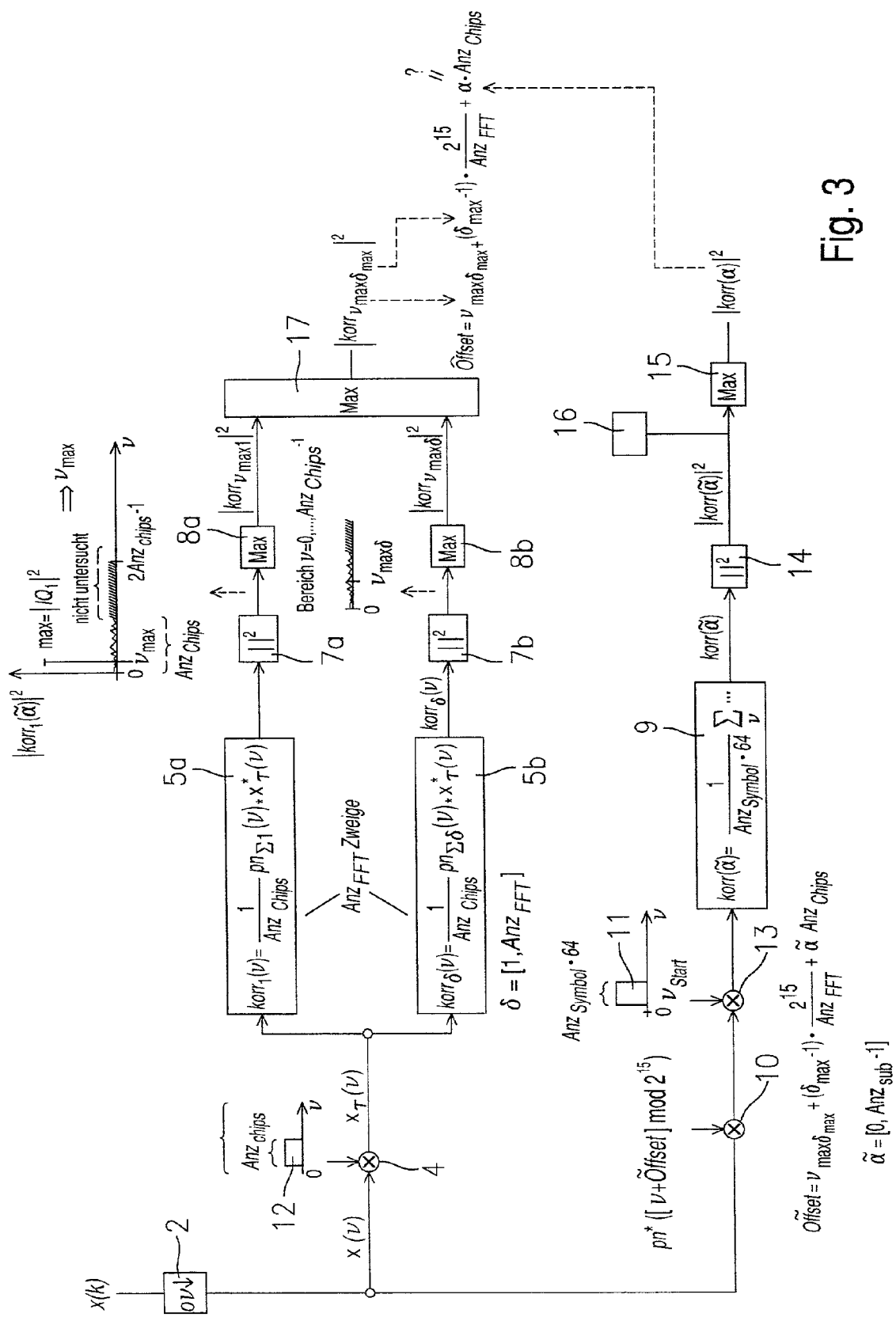
FIG. 3 is a second embodiment of an apparatus for carrying out a method according to this invention.

FIG. 3 shows a related embodiment in which reference numerals are provided for corresponding elements already described with reference to FIG. 2, which are not described again.

Contrary to the embodiment of FIG. 2, in the embodiment of FIG. 3 a plurality of correlators 5a, 5b are provided and, indeed, for each formed summed subinterval group $pn_{\Sigma 1}$ (v), $pn_{\Sigma 2}$ (v) . . . there is respectively a first correlator 5a, 5b. The correlation takes place there for the respective associated subinterval groups $pn_{\Sigma 1}$ (v), $pn_{\Sigma 2}$ (v), etc. After the first correlations 5a, 5b, formation of the absolute-value square takes place in the apparatuses 7a, 7b, and for each there is a determination of the maximum of the respective correlation in the device 8a, 8b. In a device 17, the maximum of the individual maximums from the single correlation branches is formed so that the result $|korr_{vmax\delta max}|^2$ is made available at the output. For the displacement Offset:

$$\hat{O}ffset = v_{max} + (\delta_{max} - 1) \cdot \frac{2^{15}}{Anz_{FFT}} + \alpha \cdot Anz_{chips} \quad (3)$$

with $$Anz_{FFT} = Anz_{sub\_ges}/Anz^{sub} \quad (4)$$

Also here the result regarding the factor $\alpha$ is unclear. The factor $\alpha$, however, is from the interval between 0 and $\text{Anz}_{Sub}$-1 and there are therefore fewer possible solutions that must be tested by the second correlation in the second correlator 9 than for the embodiment of FIG. 2 where $\alpha$ is from the interval between 0 and $\text{Anz}_{sub\_ges}$-1. The procedure in the branch of the second correlation 9 is the same as was already described for FIG. 2

In the extreme case represented in FIG. 1, lower, left, where the summed subinterval groups each only encompasses two subintervals and therefore only one line as representated in FIG. 1, the result at the end of the first correlation is already clear and the second correlation 9 need not be carried out.

The invention is not limited to the embodiments disclosed herein. Particularly, in FIG. 1 there are other, not represented, possible groupings for the subinterval groups.

I claim:

1. A method for synchronization of an input-chip-sequence (x(v)) of a CDMA-signal with a Pilot-Chip-Sequence (pn(v)) having the following method steps:
   dividing the Pilot-Chip-Sequence (pn(v)) into subintervals (1, 2, 3 . . . 8),
   assembling a particular number (2$\text{Anz}_{sub}$) of the subintervals (1, 2, 3 . . . 8) into subinterval groups,
   forming at least one summed subinterval group(s) ($pn_{\Sigma 1}$ (v), . . . ), wherein the at least one summed subinterval group(s) is formed line-wise and pair-wise by arranging respective series of subintervals one-after-the-other (1,2; 2,3; 3,4 . . . 8,1), with the first subinterval of a particular line being respectively the second subinterval of the previous line, and column-wise adding the chips of all the line-wise, pair-wise, arranged subintervals (1,2; 2,3; 3,4; . . . 8,1); and
   correlating the input-chip sequence (x(v)) with each summed subinterval group ($pn_{\Sigma 1}$(v), . . . ) in a first correlation (5; 5a; 5b) for determining a displacement (Ôffset) between the input-chip-sequence (x(v)) and that of the respective summed subinterval group(s) ($pn_{\Sigma 1}$(v), . . . ).

2. The method according to claim 1, wherein the first correlation (5; 5a; 5b) is limited to a first time window (12) that corresponds to a number of the chips per subinterval ($\text{Anz}_{chip}$).

3. The method according to claim 1, wherein fewer summed subinterval groups ($pn_{\Sigma 1}$(v), . . . ) are formed than there are different subintervals ((1,2; 2,3; 3 . . . 8) present in the Pilot-Chip-Sequence (pn(v)), so that the displacement (Ôffset) is unclear, with the multiple ($\alpha$) of possible results for the displacement (Ôffset) being determined by the number of chips per subinterval ($\text{Anz}_{chip}$).

4. The method according to claim 3, wherein the multiple ($\alpha$) of the number of chips per subinterval ($\text{Anz}_{chip}$) through a second correlation (9) of the input-chip-sequence (x(v)) with which the possible results for the displacement (Ôffset) shifted Pilot-Chip-Sequence (pn(v)) is determined.

5. The method according to claim 4, wherein the second correlation (9) is limited to a second time window (11) that corresponds to a whole number multiple of the number of chips per symbol ($\text{Anz}_{Symbol}$).

6. The method according to claim 1, wherein after each first correlation (5; 5a; 5b) with a summed subinterval group ($pn_{\Sigma 1}$(v), . . . ) at least one of a respective maximum of the amount and of the amount squared is determined.

7. The method according to claim 1, wherein there is a plurality of first correlations (5a, 5b) with a plurality of summed subinterval groups ($pn_{\Sigma 1}$(v), . . . ) and wherein a maximum from all first correlations (5a, 5b) is determined and is used to determine the displacement (Ôffset).

8. The method according to claim 1, wherein when the summed subinterval group(s) ($pn_{\Sigma 1}$(v), . . . ) are formed, in the pairwise arrangement of the last line (8,1), the last subinterval (8) followed by the first subinterval (1) is used.

9. A computer program with a program code for carrying out the method of claim 1 in a computer.

10. A computer program with a program code that is stored on a machine-readable medium to carry out the method of claim 1 when the program is used in a computer.

* * * * *